(12) United States Patent
Myers et al.

(10) Patent No.: US 8,646,093 B2
(45) Date of Patent: Feb. 4, 2014

(54) METHOD AND SYSTEM FOR CONFIGURATION MANAGEMENT DATABASE SOFTWARE LICENSE COMPLIANCE

(75) Inventors: Anthony George Myers, Brooklin (CA); Thomas Louis Adrian, Dublin, CA (US)

(73) Assignee: BMC Software, Inc., Houston, TX (US)

( * ) Notice: Subject to any disclaimer, the term of this patent is extended or adjusted under 35 U.S.C. 154(b) by 881 days.

(21) Appl. No.: 12/634,534

(22) Filed: Dec. 9, 2009

(65) Prior Publication Data

US 2010/0251379 A1 Sep. 30, 2010

Related U.S. Application Data

(60) Provisional application No. 61/165,505, filed on Mar. 31, 2009.

(51) Int. Cl.
*G06F 21/00* (2013.01)

(52) U.S. Cl.
USPC ............. 726/26; 726/6; 726/10; 713/156; 713/157; 705/59

(58) Field of Classification Search
None
See application file for complete search history.

(56) References Cited

U.S. PATENT DOCUMENTS

| | | | | |
|---|---|---|---|---|
| 7,155,414 B2* | 12/2006 | Barritz et al. | ............ | 705/59 |
| 7,249,107 B2* | 7/2007 | Yaacovi | ............ | 705/59 |
| 7,761,530 B2* | 7/2010 | Cain et al. | ............ | 709/213 |
| 7,797,678 B2* | 9/2010 | Moulckers et al. | ............ | 717/121 |
| 8,037,106 B2* | 10/2011 | Barrenechea | ............ | 707/803 |
| 8,161,047 B2* | 4/2012 | Akiyama et al. | ............ | 707/736 |
| 2006/0143144 A1* | 6/2006 | Speeter et al. | ............ | 706/47 |
| 2006/0200477 A1* | 9/2006 | Barrenechea | ............ | 707/100 |
| 2007/0100712 A1* | 5/2007 | Kilpatrick et al. | ............ | 705/29 |
| 2007/0239700 A1* | 10/2007 | Ramachandran | ............ | 707/5 |
| 2008/0065993 A1* | 3/2008 | Huang | ............ | 715/745 |
| 2008/0209575 A1* | 8/2008 | Conrado et al. | ............ | 726/29 |
| 2008/0256593 A1* | 10/2008 | Vinberg et al. | ............ | 726/1 |
| 2009/0019137 A1* | 1/2009 | Mishra et al. | ............ | 709/220 |
| 2009/0210435 A1* | 8/2009 | Akiyama et al. | ............ | 707/100 |

OTHER PUBLICATIONS

German, Daniel M.; Hassan, Ahmed E. License Integration Patterns: Addressing License Mismatches in Component-Based Development. IEEE 31st International Conference on Software Engineering. Pub. Date: 2009. Relevant pp. 188-198. Found on the World Wide Web at: http://ieeexplore.ieee.org/stamp/stamp.jsp?tp=&arnumber=5070520.*
BMC Remedy IT Service Management 7.5.00 Configuration Guide, Jan. 2009, © 1998, 2003, 2005-2006, 2009 BMC Software, Inc.
BMC Atrium Core 7.5.00 Concepts and Planning Guide, Jan. 2009, © 2009 BMC Software, Inc.
BMC Atrium CMDB 7.5.00 User's Guide, Jan. 2009, © 2006-2007, 2009 BMC Software, Inc.
BMC Remedy Asset Management 7.5.00 User's Guide, Jan. 2009, ©1996, 1998-1999, 2002-2006, 2009 BMC Software, Inc.

* cited by examiner

*Primary Examiner* — Cordelia Zecher
*Assistant Examiner* — Jeremiah Avery

(57) ABSTRACT

A software license engine allows an enterprise to model software license contracts and evaluate deployment of software for compliance with the software license contracts. Deployment of software products in the enterprise is modeled in a configuration management database. The software license engine maintains a license database for connecting software license contracts with software deployment modeled by the configuration management database. Users of the software license engine may use license types that are predefined in the software license engine or may define custom license types. The software license engine may indicate compliance or noncompliance with the software license contracts.

20 Claims, 15 Drawing Sheets

US 8,646,093 B2

METHOD AND SYSTEM FOR CONFIGURATION MANAGEMENT DATABASE SOFTWARE LICENSE COMPLIANCE

CROSS REFERENCE TO RELATED APPLICATIONS

This application claims priority to U.S. Provisional Application Ser. No. 61/165,505 entitled "A Method and System for Configuration Management Database Software License Compliance" filed Mar. 31, 2009 and which is incorporated by reference in its entirety herein.

BACKGROUND

This disclosure relates generally to the field of ITIL®-based (Information Technology Infrastructure Library) Configuration Management Databases (CMDBs). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for Enterprise Management Software.

The usefulness of these CMDBs is dependent on the quality, reliability, and security of the data stored in them. A CMDB often contains data about managed resources known as Configuration Items (CIs). ITIL version 3 defines a CI as "Any Component that needs to be managed in order to deliver an IT Service. Information about each CI is recorded in a Configuration Record within the Configuration Management System and is maintained throughout its Lifecycle by Configuration Management. CIs are under the control of Change Management. CIs typically include IT Services, hardware, software, buildings, people, and formal documentation such as Process documentation and [Service Level Agreements]." The CMDB serves as a point of integration between various IT management processes. Data from multiple sources often needs to be managed directly or by reference in commercial CMDBs.

One kind of CI that may be managed in a CMDB is a software asset. Organizations can acquire software in different manners. Software can be built for a specific purpose within the company. Software can be purchased from a software vendor or outsourcer. Software can be acquired through an acquisition or merger between companies, or between departments within a single company. Software asset management is a core component of an overall asset management policy. IT Infrastructure Library (ITIL) in the Software Asset Management Book defines software asset management as "all of the infrastructure and processes necessary for the effective management, control and protection of the software assets within an organization, throughout all stages of their lifecycle." ITIL indicates that the following processes make up the holistic approach to software asset management:

Overall management processes—The management processes surrounding the other software assets management processes. The overall management processes are related to change management.

Core asset management processes—Identification of software assets, including maintaining this information in the configuration management database (CMDB).

Logistic processes—Control of the software asset lifecycle. These processes include procurement, deployment, and end of life.

Verification and compliance processes—Verification and compliance of software asset management policies and procedures.

Relationship management processes—Software contract management.

Conventional CMDBs, however, do not provide adequate capability for that an enterprise is in compliance with the terms of its software license contracts.

SUMMARY

In one embodiment, a method is disclosed. The method comprises storing a first model of deployment of a software product in a configuration management database (CMDB); storing a second model of a software license contract for the software product in a license database; and evaluating compliance of the software license contract. Evaluating compliance comprises connecting the first model and the second model; comparing the first model and the second model; and generating an exception indication if the act of comparing the first model and the second model indicates non-compliance with the software license contract.

In another embodiment, a system is disclosed. The system comprises a server computer, which comprises a processor; a configuration database, coupled to the processor; a license database, coupled to the processor; and a program store, coupled to the processor, on which is stored instructions for the processor, wherein the instructions cause the processor to perform the method disclosed above.

In yet another embodiment, a computer readable medium is disclosed. The computer readable medium stores instructions for a programmable control device that cause the programmable control device to perform the method disclosed above.

In yet another embodiment, a networked computer system is disclosed. The networked computer system comprises a plurality of computers on which software products are deployed; and one or more configuration management database computers, communicatively coupled to the plurality of computers, programmed to perform the method disclosed above.

DETAILED DESCRIPTION

Various embodiments disclosed herein provide the ability to use a CMDB to monitor and verify software license compliance in an enterprise. Using a variety of rules related to different license types, a license engine may associate license certificates with software contracts, and evaluate compliance with some of the terms of those contracts. When a non-compliance event is discovered, the enterprise may take appropriate action to bring the software assets represented by the CIs in the CMDB into compliance with the license contracts under which the software was acquired.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
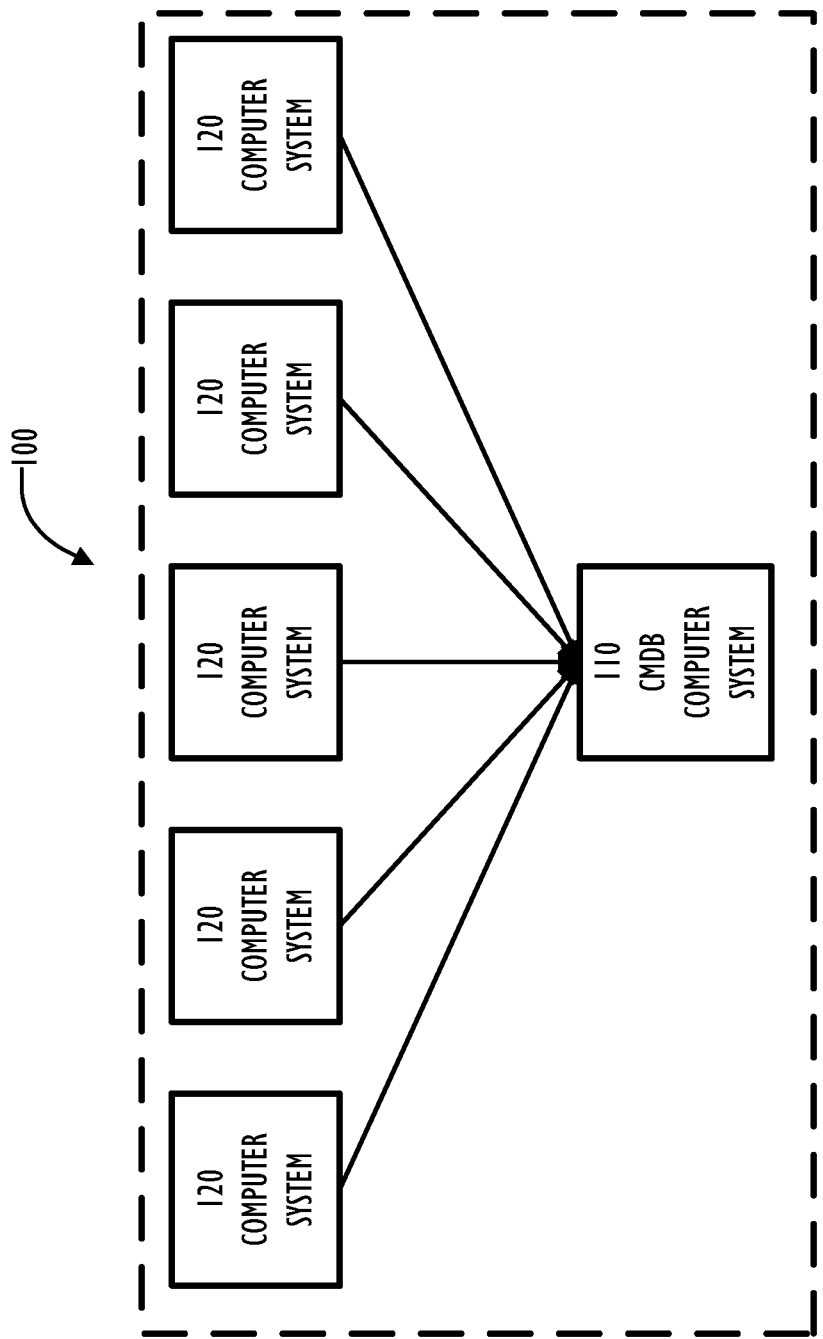
FIG. 1 shows, in block diagram form, an example of a collection of computer systems of an enterprise that are managed by a CMDB according to one embodiment.

FIG. 1 is a block diagram illustrating a CMDB server 110 that manages a collection of computer systems 120 for an enterprise 100. Each of the computer systems 120 has hardware and software components, including network connectivity components that are modeled as CIs in the CMDB server 110. Although illustrated here as a single CMDB server 110 for clarity, a CMDB may comprise a plurality of computer systems that together provide the services of the CMDB server 110. The computer systems 120 may be any types of computer systems, including laptop, desktop, blade server, and mainframe computers. In addition to modeling the organizational structure of the enterprise 100 and the hardware components of the computer systems 120 as CIs, the CMDB server 110 may model the software product packages or components installed on each of the computer systems 120, as well as the software contracts under which that software is licensed. Discovery of those hardware and software components is preferably an automated process, but the techniques for discovering and storing the information modeled by CIs for hardware and software components in the CMDB server 110 is outside the scope of the present invention.

Figure 2:
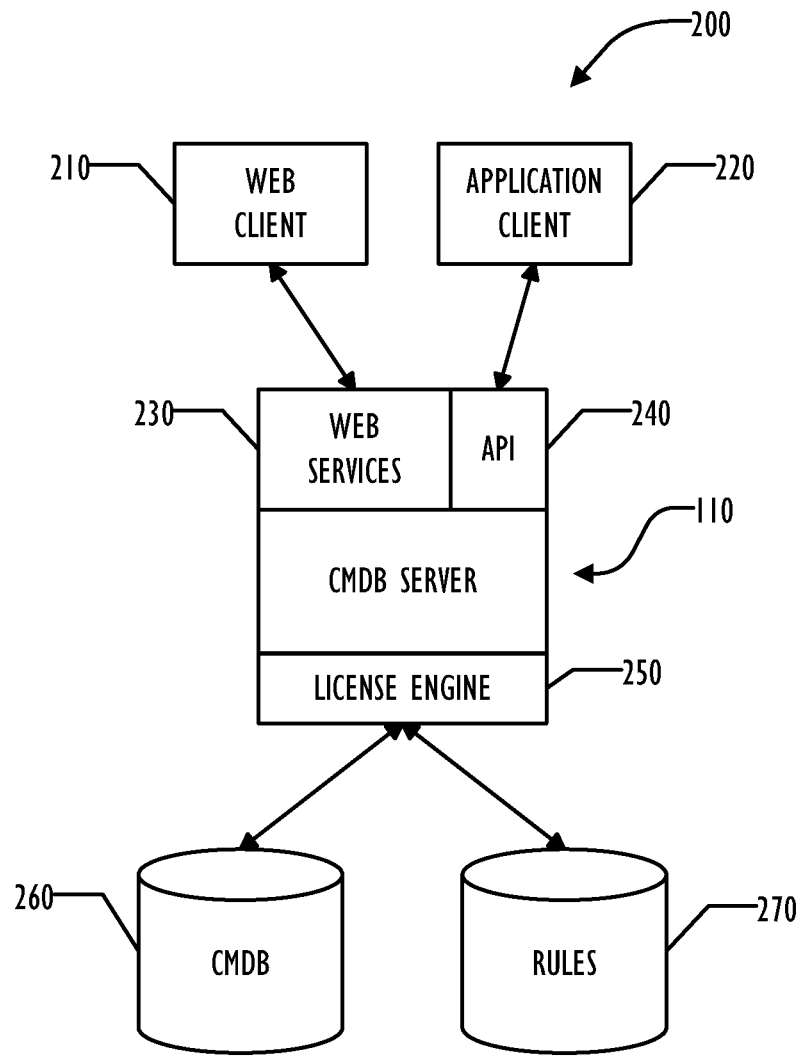
FIG. 2 shows, in block diagram form, a CMDB system according to one embodiment.

FIG. 2 is a block diagram illustrating a system 200 according to one embodiment with the CMDB server 110 of FIG. 1 and a pair of clients 210 and 220. The CMDB server 110 may comprises a number of software components, including a web services component 230 for interacting with a web client computer 210, and an Application Programming Interface (API) 240 for interacting with an application client computer 220. The application client computer 220 may be a computer running any application designed to interact with the CMDB server 110 through the API, including, for example, a desktop computer with a CMDB client application running in a Microsoft WINDOWS® environment (WINDOWS is a registered trademark of Microsoft Corporation) that provides a graphical user interface (GUI) to the user of the client computer 220; however, an application may interact with the CMDB server 110 without a GUI.

The CMDB server 110 also comprises a license engine 250 for performing the functionality described in more detail below related to software license compliance. The CMDB server 110 may include other software components for providing CMDB functionality as desired.

Data for the CMDB server 110 is illustrated as stored in a CMDB datastore 260 and a license datastore 270. The CMDB datastore 260 comprises the storage for the conventional CMDB data, including CIs. Although shown as a single unit in FIG. 2, the CMDB datastore 260 may be implemented as a plurality of storage units as desired. The techniques for storing the data in the CMDB datastore 260 are outside the scope of the present invention. The license datastore 270 is illustrated as a separate datastore for clarity, but may be integrated with the CMDB datastore 260. The license datastore 270 provides storage for to model software contracts, including rules against which the CIs are evaluated for software license compliance and other information necessary for processing those rules. The CMDB datastore 260 and the license datastore 270 may be implemented as a collection of flat files, a structured query language database, or in any other way desired.

Figure 3:
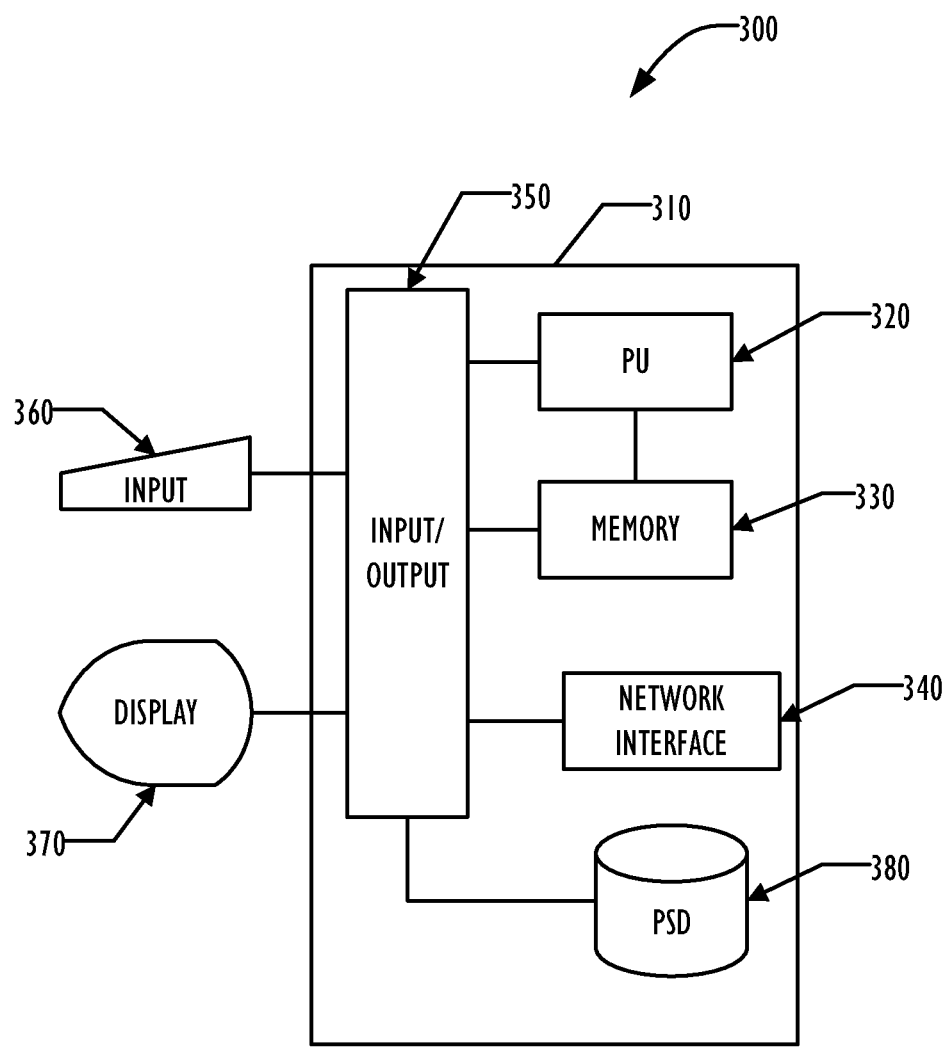
FIG. 3 shows, in block diagram form, an example computing device used for the credential server or client according to one embodiment.

Referring now to FIG. 3, an example computer 300 for providing the CMDB server 110 is shown. Example CMDB server computer 300 comprises a system unit 310 which may be optionally connected to an input device or system 360 (e.g., keyboard, mouse, touch screen, etc.) and display 370. A program storage device (PSD) 380 (sometimes referred to as a hard disc) is included with the system unit 310. Also included with system unit 310 is a network interface 340 for communication via a network with other computing and corporate infrastructure devices (not shown). Network interface 340 may be included within system unit 310 or be external to system unit 310. In either case, system unit 310 will be communicatively coupled to network interface 340. Program storage device 380 represents any form of non-volatile storage including, but not limited to, all forms of optical and magnetic storage elements including solid-state storage, including removable media, and may be included within system unit 310 or be external to system unit 310. Program storage device 380 may be used for storage of software to control system unit 310, data for use by the credential store system 300, or both.

Figure 4:
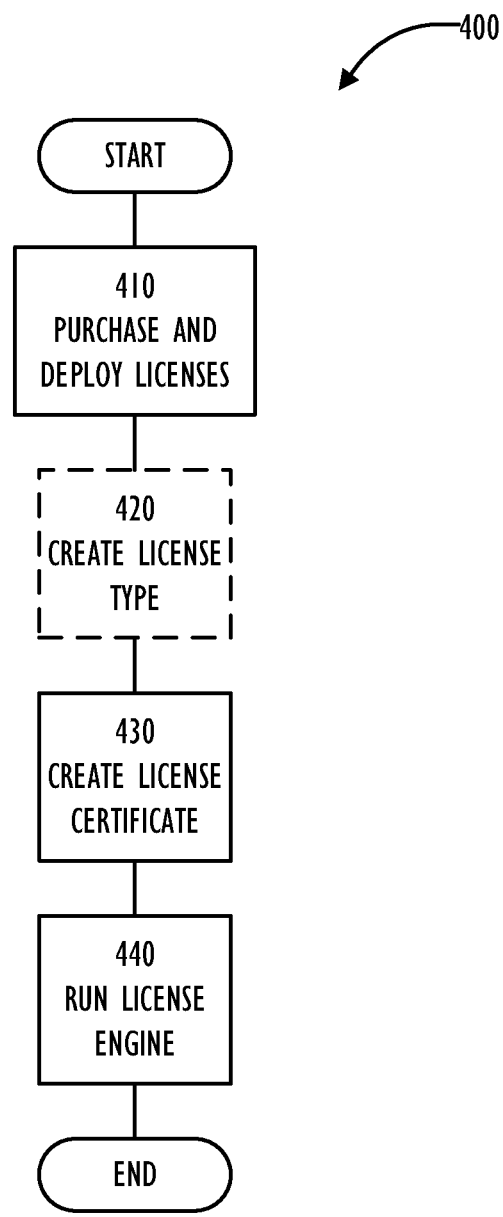
FIG. 4 shows, in flowchart form, an example technique for monitoring and verifying software license compliance according to one embodiment.
Figure 5:
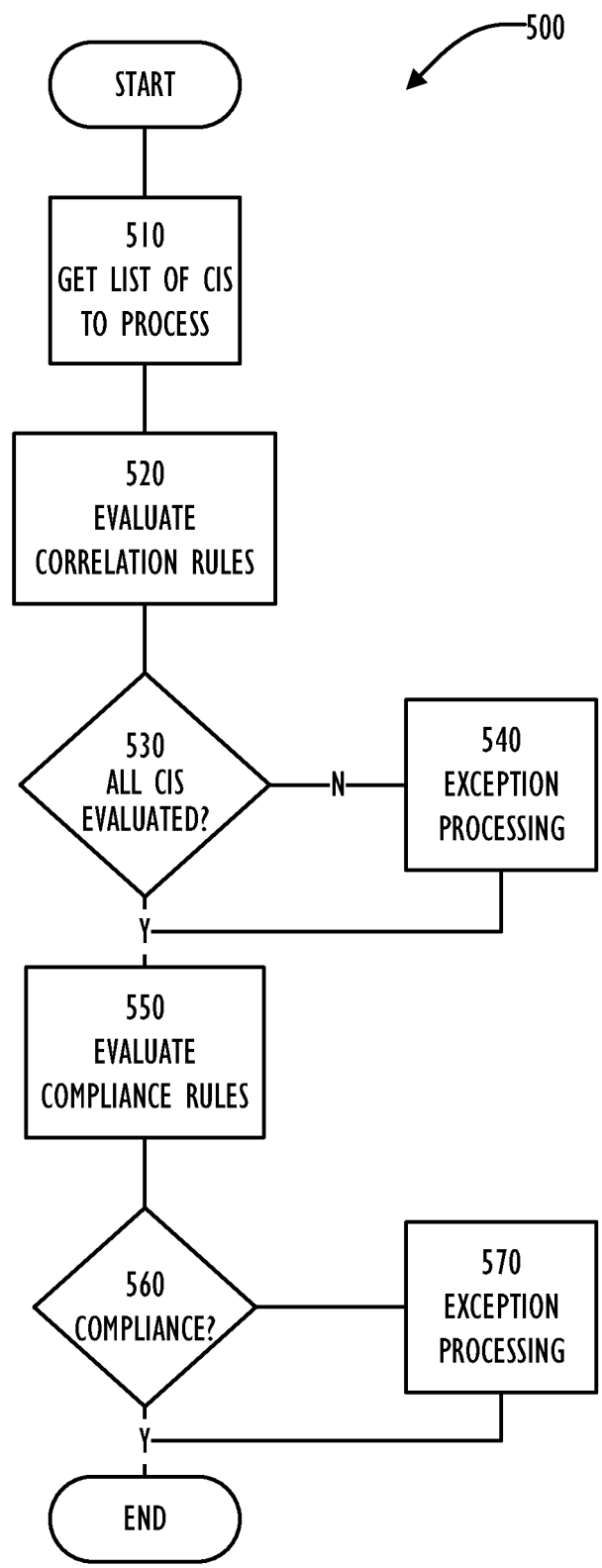
FIG. 5 shows, in flowchart form, an example of a technique employed by a license engine according to one embodiment.

System unit 310 may be programmed to perform methods in accordance with this disclosure (examples of which are in FIGS. 4-5). System unit 310 comprises a processor unit (PU) 320, input-output (I/O) interface 350 and memory 330. Processing unit 320 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company.) Memory 330 may include one or more memory modules and comprise random access memory (RAM), read only memory (ROM), programmable read only memory (PROM), programmable read-write memory, and solid-state memory. One of ordinary skill in the art will also recognize that PU 320 may also include some internal memory including, for example, cache memory.

Similar computer systems may be used as clients for accessing the CMDB server 110, such as the web client 210 and the application client 220 of FIG. 2.

FIG. 4 is a flowchart illustrating a technique 400 for performing software license compliance monitoring and verification according to one embodiment. In block 410, the software licenses are purchased or otherwise acquired and deployed on the computer systems 120 of the enterprise 100.

Information about the software contracts is stored as CIs in the CMDB datastore 260 using one or more of the clients 210/220. Table 1 illustrates an example of information that may be stored about a software contract according to one embodiment. The information listed below is illustrative only and other collections of information about software contracts may be used as desired.

TABLE 1

Software Contract Information

| Field name | Description |
|---|---|
| ID | A unique alphanumeric value. |
| Summary | Brief description of the contract. |
| Term | Select the applicable term:<br>Fixed—Contract expires at the expiration date.<br>Never Ending—Contract never expires.<br>Rolling Contract—Contract automatically renews at the expiration date |
| Status | Select the applicable status of the contract:<br>Draft—The contract has never been executed but is going through the process of being executed. Draft status may be used for contracts that are in negotiation or pending signature.<br>Executed—The contract that is executed and valid. Executed contracts include active contracts that have started. An executed contract may have additional status information, including status reasons, such as: active, change pending, on hold, requires attention, under renegotiation.<br>Historical—The contract is not valid. Historical contracts include contracts that have expired, been terminated, or been canceled.<br>Delete—The contract is scheduled for deletion. |
| Company | The company associated with this contract. |
| View | Access Select who can view or modify this contract:<br>Public—Anyone who can access contracts can view or modify the contract.<br>Internal—Only people in the support group managing this contract can view or modify the contract. |
| Supplier Name | The supplier associated with this contract. |
| Cost Center | The cost center that owns this contract. |
| Support Company | The support company associated with this contract. |
| Support Organization | The support organization associated with this contract. |
| Notification Group | The notification group associated with this contract. |
| Notification Contact | An individual to receive notifications for this contract. |
| Owner Group | The group responsible for this contract. |
| Owner Contact | An individual responsible for this contract. |
| Expiration Date | Date contract expires. When a contract expires, individuals are notified first, then groups. |
| Notification Date | When the contract expires, the notification contact and the owner contact are notified on this date. |

Some of the information listed in Table 1 above may be optional and omitted as desired when entering information about a software contract into the CMDB datastore 260.

After the information about each software contract deployed is entered into the CMDB datastore 260, in one embodiment in block 420 a new license type may be created, if needed. Block 420 is shown in dashed lines, indicating that this block may omitted if all necessary license types have already been created or in embodiments which do not provide for creation of custom license types.

License types may be used for software license management. In one embodiment, a license type wizard allows administrators with appropriate permissions to create custom license types for license certificates. After the license type wizard has been completed and the license type has been saved, the license types are used when a contract manager or software asset manager creates certificates in block 440, as described below.

When the license engine runs, company and product information and answers to correlation rules questions supplied when the certificate was created are used to determine which CIs should be connected to the license certificates. Compliance is also calculated based on the answers to questions supplied and the configured compliance actions that act on these values. In one embodiment, a default behavior for connection compares the company information and product categorization in license certificates with CIs to determine which CIs to connect to a license certificate. In one embodiment, a default behavior for compliance queries license certificates that match a license type and tests the result of the query against compliance criteria.

In one embodiment, license types may specify the following information:

(1) What questions a contract manager or software asset manager must answer when adding a new software license certificate.

(2) How connection questions are used to select CIs from the CMDB datastore 260.

(3) How compliance is computed based on compliance questions and actions specified during license type creation, such as relating CIs to a license certificate or creating exceptions.

In one embodiment, the CMDB server 110 provides a default set of pre-defined license types, as illustrated in Table 2 below. These license types are illustrative and by way of example only, and other license types may be provided as pre-defined license types.

TABLE 2

License Types

| Contract type | Description |
|---|---|
| Enterprise | An enterprise license type licenses all of the software from a manufacturer that is being used by a given company. There is one enterprise license per company. Anyone in the company can use the license. This license type is set to non-groupable.<br>Connection |
| | Uses the default certificate criteria for connections.<br>Compliance |
| | One computed compliance question is specified for number of licenses deployed. The certificate for this license type is always compliant. |
| Site | A site license type licenses all of the software from a manufacturer that is being used by a given site. A site license applies to a single site within a company. If a site license applies to multiple sites within a company, the contract manager or software asset manager can add a site license certificate for each site. This license type is set to non-groupable.<br>Connection |
| | Uses the default certificate criteria for connections. In addition, one connection question exists for this license type, which is "Enter Certificate Site?" When the license type is created, this question maps to the site of the computer system on which the product is installed. |

TABLE 2-continued

License Types

| Contract type | Description |
|---|---|
| | For each product that matches the default certificate criteria for connections, the site of the computer system on which the product is installed is used to connect the product to the license certificate for that site.<br>For example, a contract manager creates a license certificate with the default certificate criteria for connections:<br>Company = XYZ Services<br>Manufacturer = Microsoft<br>Product = Visio<br>The contract manager specifies this Site license certificate is for BackOffice Support.<br>A copy of Microsoft Visio is installed on a computer in Frontoffice Support. That product is not connected to the license certificate.<br>A computer in BackOffice Support Services has both Microsoft Visio and Microsoft Word installed. Microsoft Visio is connected to the site license, but Microsoft Word is not (perhaps it is connected to an Enterprise license).<br>Compliance |
| Per instance | One computed compliance question is specified for number of licenses deployed. The certificate for this license type is always compliant.<br>Each instance of the license is counted as one license consumed.<br>Any instance of software found requires a license.<br>This license type is set to groupable.<br>Connection |
| | Uses the default certificate criteria for connections.<br>Compliance |
| | The following compliance question is asked:<br>Number of licenses purchased?<br>Breach warning level 1?<br>Breach warning level 2?<br>Number of licenses deployed (computed question)<br>The answers to this question are used to:<br>Determine the number of software instances related to the certificate<br>Set the certificate to not compliant, if the number of software instances related to a certificate is greater than the number purchased.<br>Example |
| Per copy per device | Two instances of BMC Atrium CMDB Enterprise Manager were found. In this situation, two licenses are required.<br>The number of copies per device is counted as one license consumed. If the number of copies per device is exceeded, the license is out of compliance. The per device number specified for a license type determines how many copies can be installed on each device. This license type is set to groupable.<br>Connection |
| | Uses the default certificate criteria for connections.<br>Compliance |
| | The following compliance questions are asked:<br>Number of licenses purchased?<br>Breach warning level 1?<br>Breach warning level 2?<br>Number of copies allowed per device?<br>Number of licenses deployed (computed question).<br>The answers to these questions are used to compute compliance:<br>If any devices have more than the allowable number per device, the certificate is marked as not compliant.<br>Also, if the number of software licenses related to a certificate is greater than the number purchased, the certificate is marked as not compliant. |
| | Example |
| Per copy | Two copies of Microsoft Word were found on a computer, but only one license exists. If the number of copies allowed on a device is one, this is not compliant.<br>This license type is per copy per user. Each unique user (since, for example, there could be two software items linked to one user) is counted as one license consumed. If a user is not linked to a license, it is assumed that one license is consumed. This license type is set to groupable.<br>Connection |
| | Uses the default certificate criteria for connections.<br>Compliance |
| | Compliance is computed based on the number of unique individuals using a software product. The following compliance question will be asked:<br>Number of licenses purchased?<br>Breach warning level 1?<br>Breach warning level 2?<br>Number of licenses deployed (computed question).<br>The answers to these questions are used to determine the number of unique individuals connected to a product. If the number counted is greater than the number of licenses purchased, the license certificate is set to not compliant.<br>Example |
| Fixed | Two copies of an application were found on separate computers owned by one user and only one license exists. This situation is compliant, because only one license is required.<br>This license type requires a license for every user using the product.<br>Connection |
| | Uses the default certificate criteria for connections.<br>Compliance |
| Floating | Compliance is computed based on the number of individuals using a software product, not the number of installations.<br>This license type is per concurrent user.<br>Connection |
| | Uses the default certificate criteria for connections.<br>Compliance |
| | Compliance is computed based on the maximum number of concurrent users. The number may be unlimited. |

Preferably, custom license types in addition to the those listed in Table 2 above may be defined.

After any new license types are created to handle the terms of the new software contracts terms, license certificates may be created in block 430, to link software contracts to CIs. A license certificate indicates the right to deploy software in the environment managed by the CMDB server 110. In one embodiment, a license certificate comprises the information listed in Table 3 below. The information disclosed in Table 3 below is illustrative and by way of example only, and other license certificate information may be used.

TABLE 3

License Certificates

| Field name | Description |
| --- | --- |
| Company | This information comes from the software contract. |
| Software Contract ID | |
| Certificate ID | The certificate ID identifies the license certificate in listings and reports. It does not have to be unique. |
| Summary | This field provides additional space to describe the certificate. |
| Status | Initially set to Draft. |
| License Category Type | Select from Client, Server, or Mainframe. |
| License Type | The appropriate license type. The license type determines the connection questions and the compliance questions. |
| Cost Center | This information comes from the software contract, but can be changed. |
| Effective Date | The date that the license becomes effective. |
| Expiration Date | The date that the license expires. If the license does not expire, this field may be left blank. |

In some embodiments, one contract may have multiple certificates, and software compliance may be tracked at the software level.

In one embodiment, the license engine 250 may ask for additional information when creating the license certificates. This information may comprise connection details, to allow the license engine 250 to connect the license certificate to CIs. The information may also include compliance information. For example, the license engine 250 when creating a per copy license certificate may ask how many licenses were purchased. For a site license, the license engine may ask the identity of the location for which the license was purchased. For a per copy per device license, the license engine 250 may ask how many licenses were purchased and how many copies per device are allowed under each license. Other questions may be asked depending typically on the license type. The additional information supplied in response to those questions may be included in the license certificate as it is stored in the license datastore 270.

In one embodiment, script-based rules may be created for additional custom license types to represent complex license entitlements, allowing a user of the license engine 250 to add and configure new license types without changes to the code of the license engine 250. For example, a license type may be created with rules for an application that executes in a virtual machine, where the rules are based on the number of physical processors on the physical machine. Because of the relationships available from the CMDB datastore 260, the license model for this license type may navigate back to the physical hardware to understand the number of processors when checking compliance.

In one embodiment, license certificates may be grouped into certificate groups. Certificate groups consolidate the tracking of license certificates. A master certificate is grouped with individual child license certificates. The CIs may be attached to the master certificates. License allocation numbers are attached to the child license certificates. For example, under the same software contract, 200 licenses for Microsoft Word are purchased. Later, 100 more licenses are purchased. Two CIs are created in the CMDB 260, one for each license purchase. In this example, it does not matter which CI is attached to a specific license certificate. For compliance, it only matters that the licensee does not exceed 300 Microsoft Word instances for the contract. By grouping license certificates and attaching the CIs to a master certificate for the group, the licensee may gain flexibility in how the license certificates are applied. On the master certificate, in one embodiment, the sequence to which license certificates are allocated to matching CIs may be specified. When the first license in the sequence is fully used, the License Engine may apply CIs to the next license certificate. As a result, one or more of the last certificates in the sequence may be out of compliance, while earlier certificates may be in compliance.

Certificate groups may also help avoid unnecessary warnings in some embodiments. Consider the preceding Microsoft Word license example. In one embodiment, the license engine 250 may provide warning indications when a license certificate is nearly completely applied. If the license certificates are not grouped, in such an embodiment, for example, the license engine 250 may generate a warning when 190 CIs are attached to the first license certificate. Although there is another license certificate that is valid for 100 instances, the first certificate would be approaching the maximum usage. If, however, the certificates are grouped, for compliance checks, that is equivalent to having one certificate for 300 instances and a warning may be generated only when the last certificate in the sequence approaches being completely allocated.

When a certificate expires, the license engine 250 may check for compliance in one embodiment. If there are enough licenses remaining in the group in other certificates, the license engine 250 may not generate a warning or non-compliance indication. If a license certificate is not part of a group, when it expires, all the related CIs are out of compliance.

Returning to FIG. 4, after the license certificates are created, then in block 440, the license engine 250 is run. The license engine evaluates the status of the software licenses modeled in the CMDB 260 against the license certificates created in block 430.

FIG. 5 is a flowchart illustrating an overview of a technique 500 for evaluating software license compliance by the license engine 250 according to one embodiment. In block 510, the license engine obtains a list of CIs to process. This list may be specified directly by a user of one of the clients 210/220 or may be automatically generated by an update to the CMDB 260 that adds software contracts or instances of deployment of software on one of the computer systems 120 of the enterprise 100.

Then in block 520, correlation rules may be evaluated to connect each of the identified CIs to license certificates. In block 530, if any CIs are not connected to license certificates by the correlation rules, or if the license engine 250 determines that multiple license certificates would match to a CI, then in block 540 any desired exception processing may be performed.

In block 550, compliance rules may be evaluated to determine whether each of the software CIs complies with the terms of the software contract. In block 560, if any CI is not in compliance, then any desired exception processing may be performed.

Exception processing as performed in blocks 540 and 570 in one embodiment may be simply producing an error message or report indicating the exception. The exception may indicate a non-compliance condition. In one embodiment, additional exceptions may be triggered when a software license contract is in compliance but is within a window of near non-compliance, such as when nearly all of the purchased licenses have been deployed. Such warning indications may allow preventative measures to be taken before a non-compliance condition exists.

In other embodiments, more sophisticated exception processing may be performed. For example, in one embodiment, a noncompliance exception indicating that more instances of a particular software are deployed than are licensed may automatically trigger a request to purchase sufficient additional license to bring the enterprise 100 back into compliance. In another embodiment, the same situation may trigger an analysis to attempt to determine which, if any, of the existing instances of the software may exceed the need of the enterprise 100 need for the software, and in a further embodiment, may trigger the removal of a software package from one or more computer systems 120.

In one embodiment, a compliance exception may be generated at multiple levels. The multiple levels may be defined as desired by the person creating the compliance rules, but typically relate to how much the particular CI is out of compliance. For example, if a software contract acquires 100 licenses for a particular software package, and the license engine 250 discovers that 101 licenses are in use, a compliance rule may trigger a Breach Level 1 exception, but if the license engine 250 discovered that 110 licenses are in use, a Breach Level 2 exception may be signaled. In one embodiment, up to three levels of non-compliance exceptions may be signaled by the license engine 250.

In one embodiment, compliance results may be rolled up to consolidate compliance reporting at higher levels than a single contract. For example, in such an embodiment compliance results may be reported for the entire organization or for a particular software product or vendor.

Figure 6:
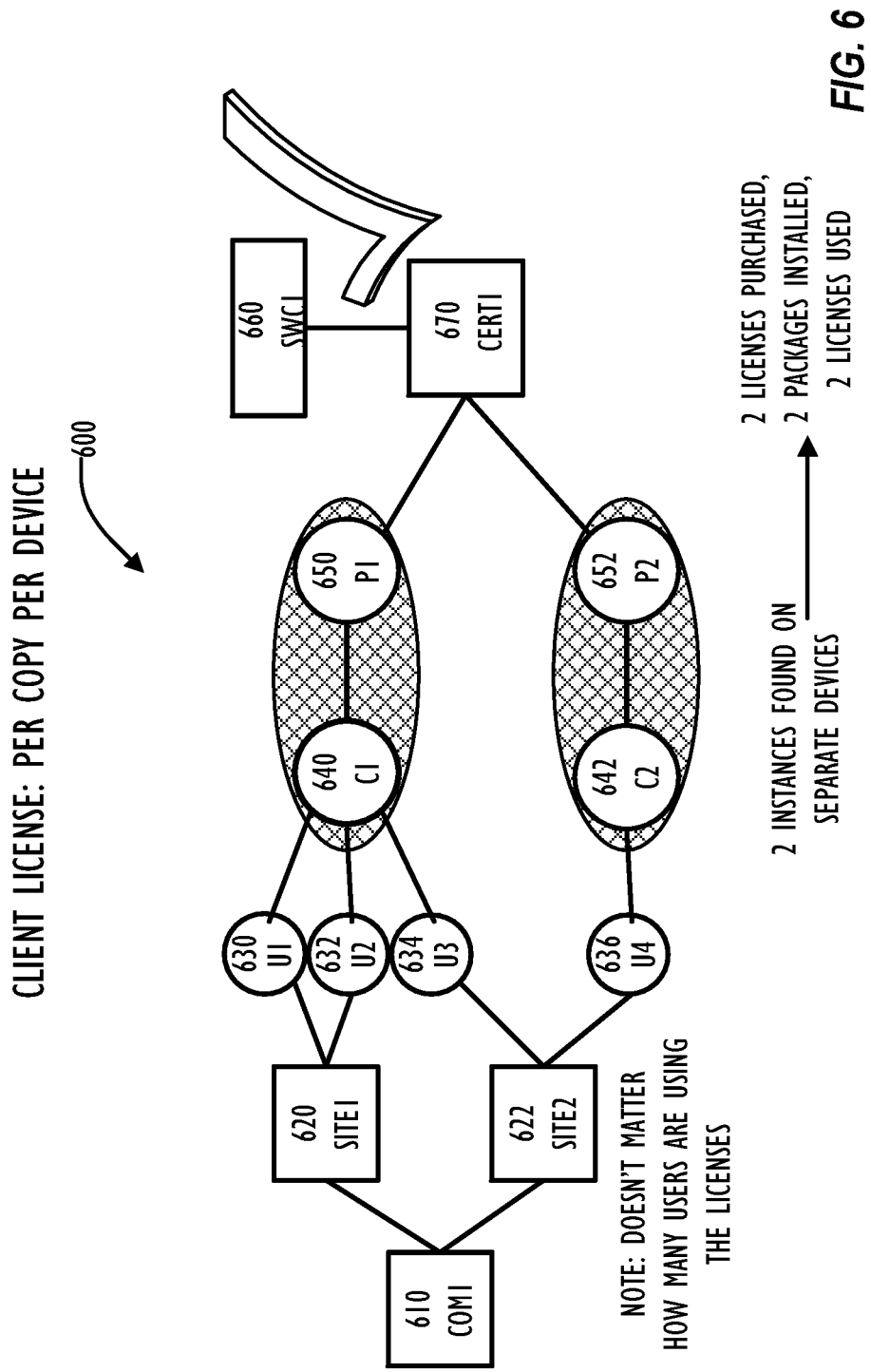
FIGS. 6-15 show, in graph form, examples of compliance and non-compliance determined by a license engine according to one embodiment.

FIGS. 6-15 are graphs illustrating examples of compliance and non-compliance that may be determined by the license engine 250. In FIG. 6, a graph 600 illustrates compliance with a per copy per device license. Company 610 has purchased two licenses for some software, which is used at two different sites (620 and 622) by four users. In this example, the software contracts do not limit the number of users that may use a given copy of the licensed software. Users 630 and 632 use the software at Site 620, and the software is installed once as package 650 on computer 640. Users 634 and 636 use the software at Site 622, also part of company 610. The software is installed on computer 642 as package 652. The license engine 250 connects certificate 670 to contract 660. Because the 2 instances of the software found installed in the CMDB 260 match the 2 licenses purchased by company 610, only 2 licenses are in use, and the company 610 complies with software license contract 660.

Figure 7:
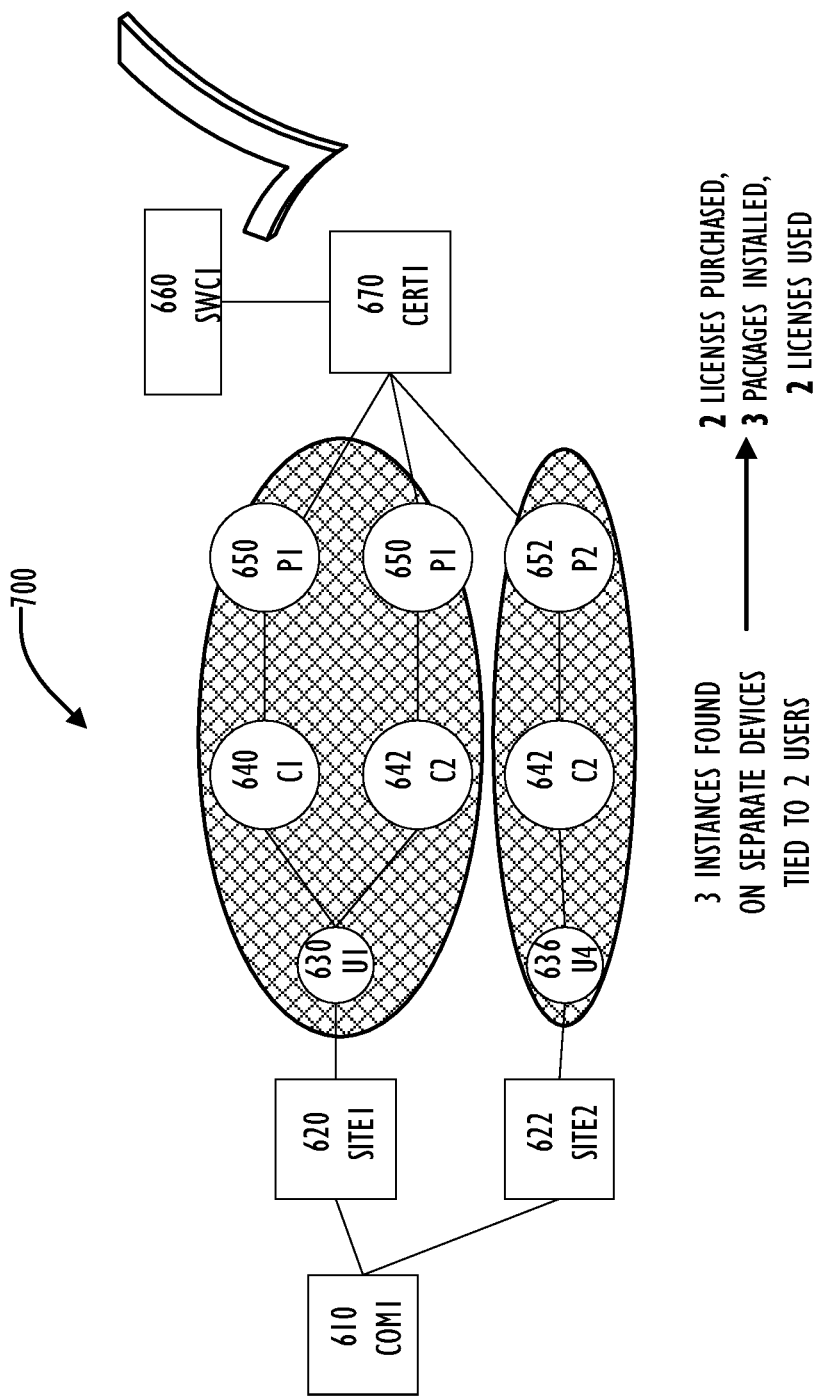

FIG. 7 is a graph illustrating example 700, in which the software contract 660 is a per copy license, which allows 2 separate users to have a copy of the software. As before, the software is installed for two sites 620 and 622 of company 610. In this example, however, the software is installed twice by user 630, once as package 650 on computer 640, and once as package 650 on computer 642. In addition, user 636 has installed the software on computer 642 as package 652. Although there are three instances of the software installed on two separate devices, the three instances are associated with only two users. Therefore, only two per copy licenses are used, and the company 610 complies with software contract 660.

Figure 8:
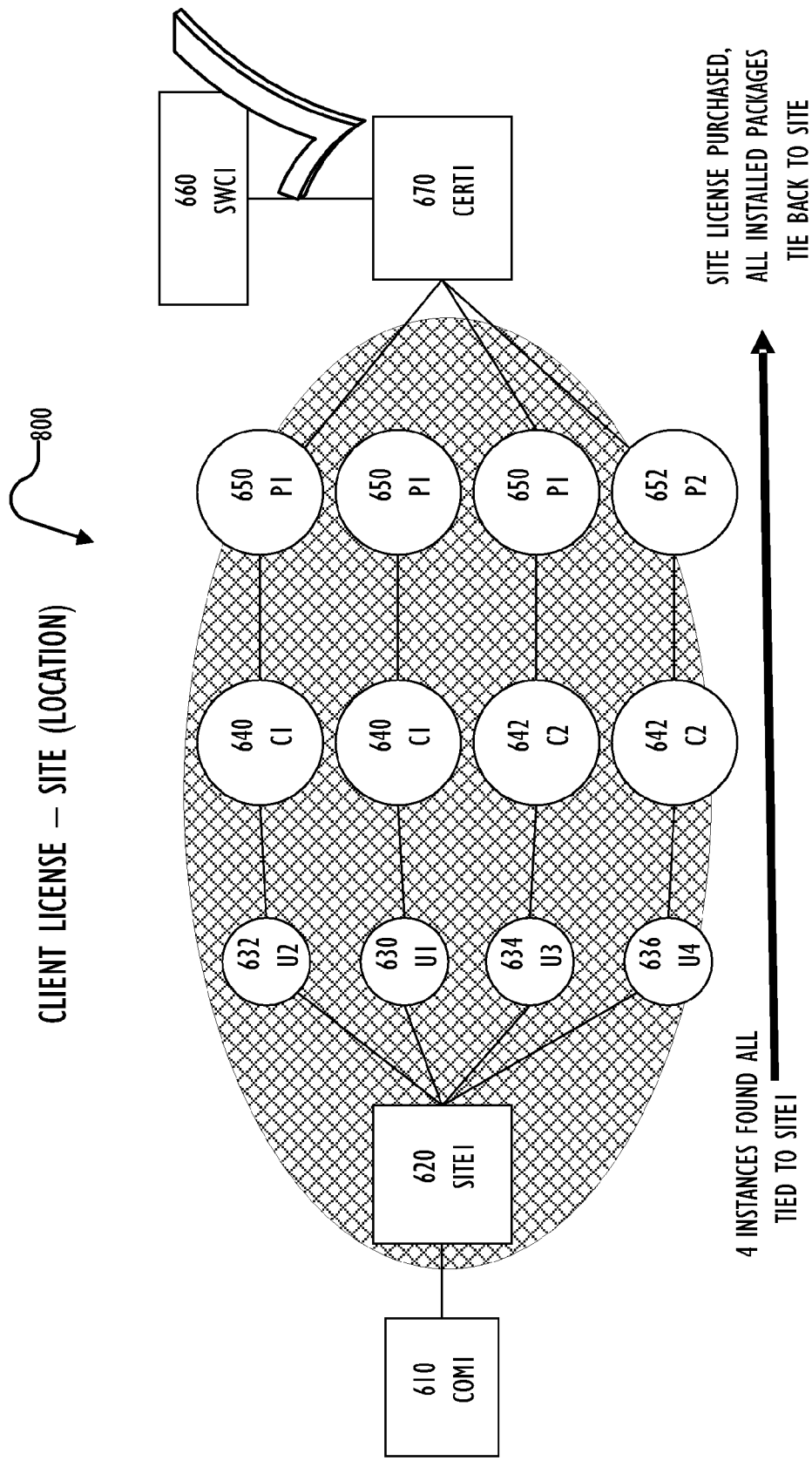

FIG. 8 is a graph illustrating example 800, in which software contract 660 is a site license. In this example, four instances of the software are found installed, with user 632 installing package 650 on computer 640, user 630 installing package 650 on computer 640, user 634 installing package 650 on computer 642, and user 636 installing package 652 on computer 642. Because all installed packages tie back to site 620, the software contract 660 is in compliance.

Figure 9:
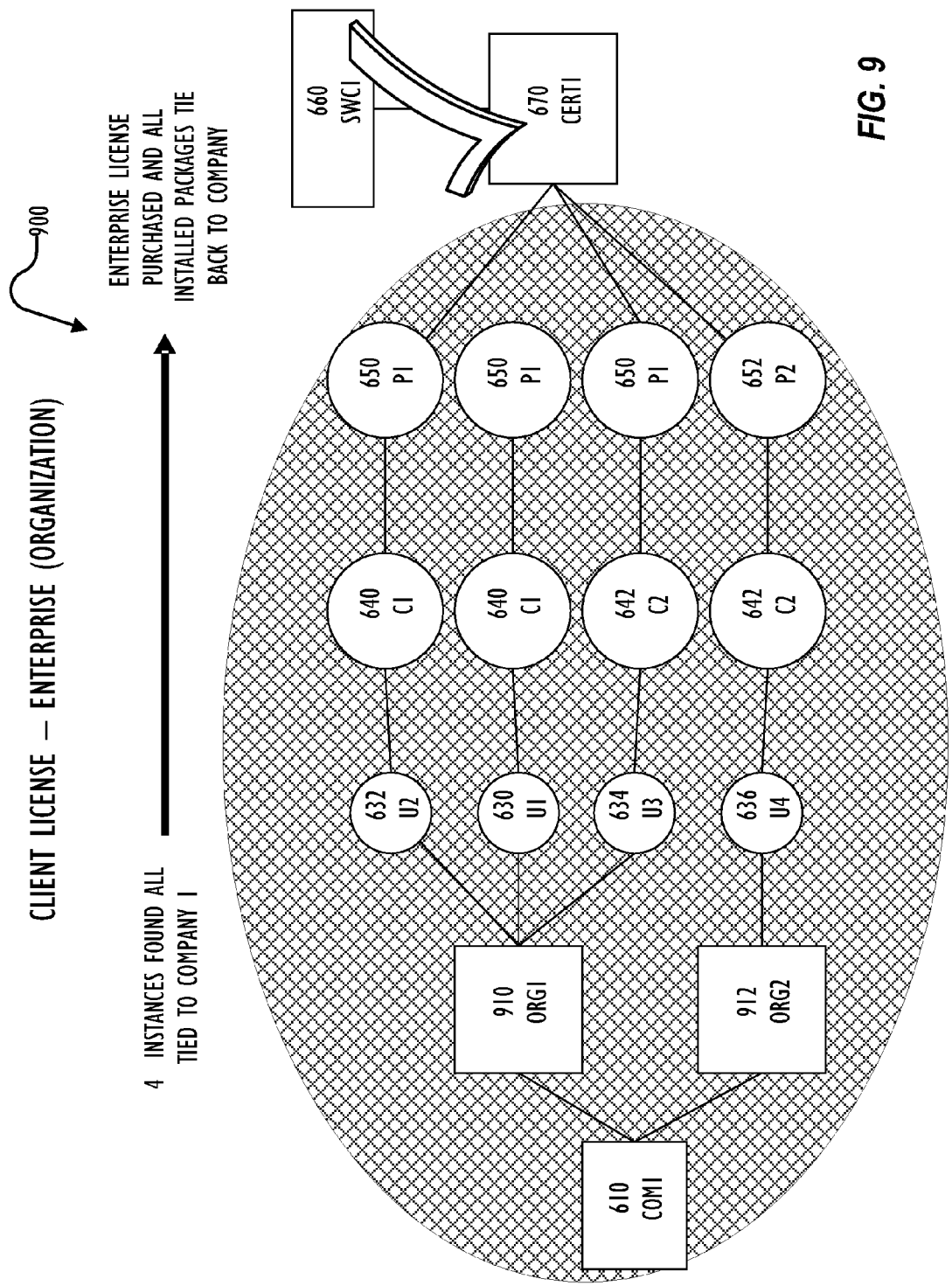

FIG. 9 is a graph illustrating example 900, in which software contract 660 is an enterprise-wide license. In this example, company 610 has two divisions or organizational units 910, 912, which may be at different sites or the same site. Users 630, 632, and 634 are tied to organizational unit 910, and user 636 is tied to organizational unit 912. The four instances of the software illustrated in FIG. 9 are all tied to company 610, thus the enterprise software contract 660 is in compliance.

Figure 10:
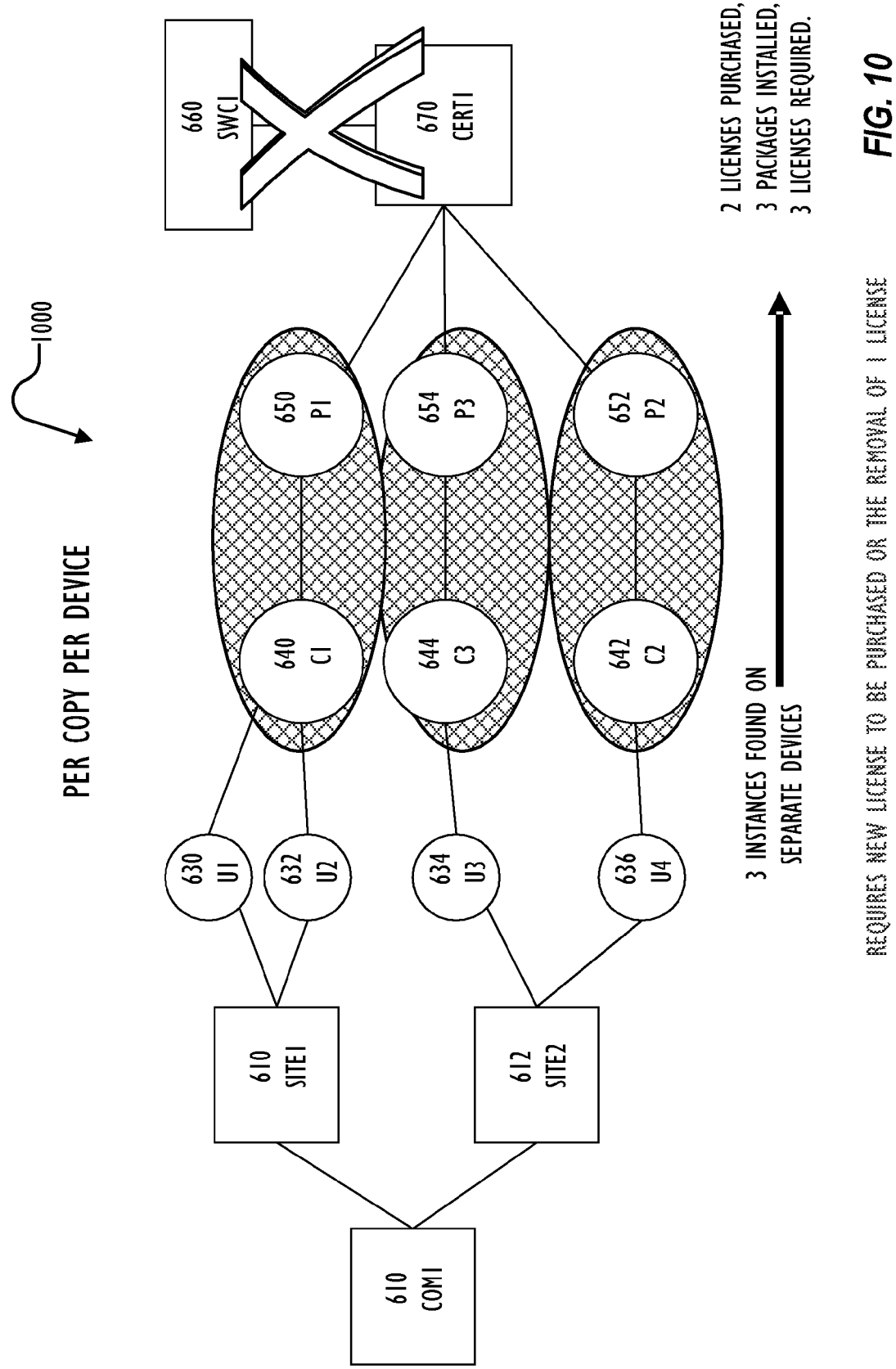

FIGS. 10-15 illustrate various non-compliance scenarios. In FIG. 10, example 1000 is illustrated by a graph in which software license 660 is a per copy per device type of license, with two licenses for the software. In this example, three instances are found on three separate devices: package 650 is installed on computer 640 for use by users 630 and 632, package 654 is installed on computer 644 for use by user 634, and package 652 is installed on computer 642 for use by user 636. Thus, the software license contract 660 is not in compliance, and the license engine 250 generates a non-compliance exception, indicating that the company 610 is out of compliance with the license. To bring the company 610 back into compliance, either one new license may be purchased, or one of the three instances 650, 654, and 652 removed.

Figure 11:
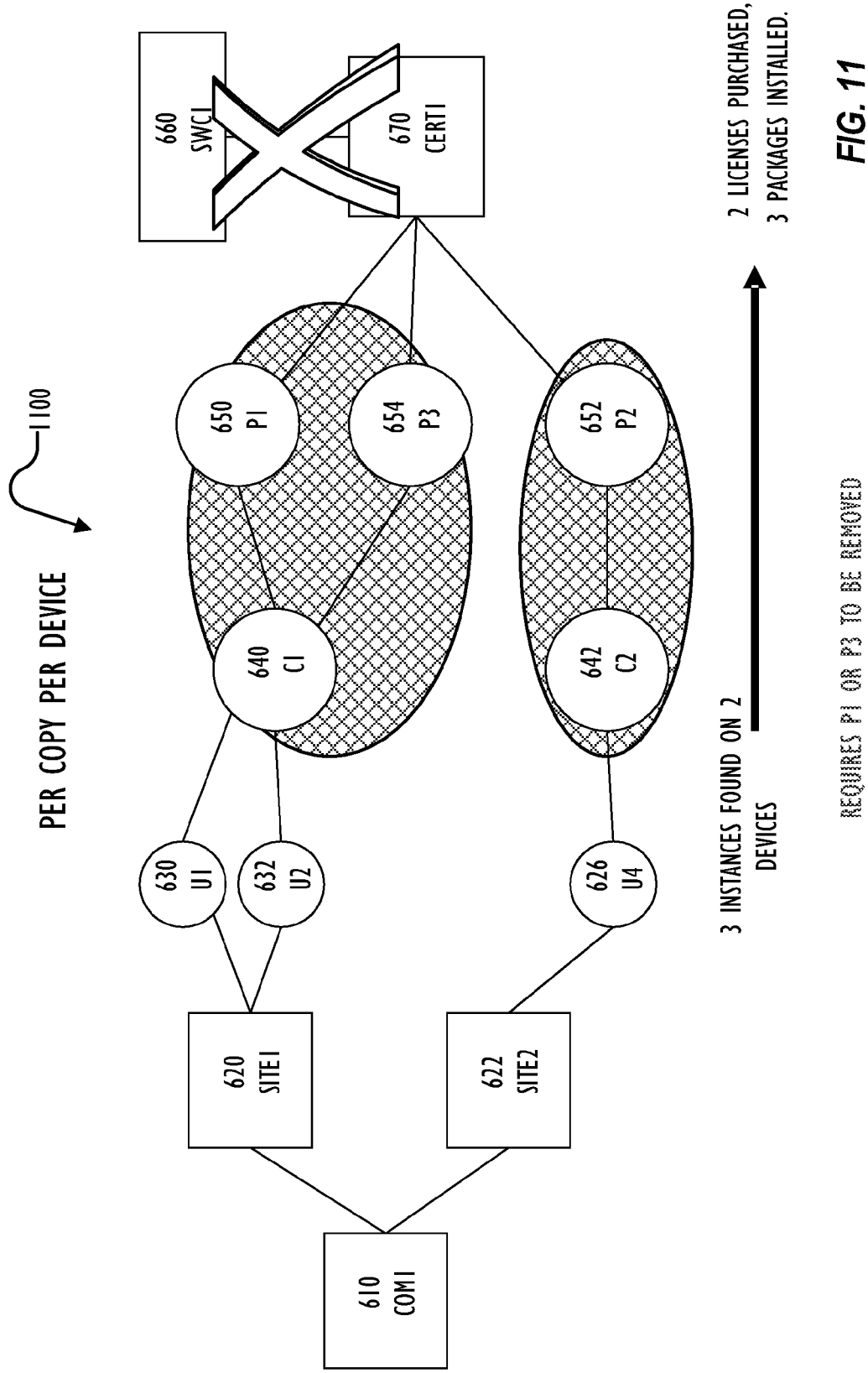

FIG. 11 is a graph illustrating example 1100, in which another per copy per device software contract 660 is considered. In this example, company 610 has acquired two licenses. Although the licensed software is only installed on two computers 640 and 642, two packages 650 and 654 of the software are installed on computer 640, while one package 652 is installed on computer 642. Thus there are three licenses used, one more than allowed by the contract 660, and company 610 is not compliant with contract 660.

Figure 12:
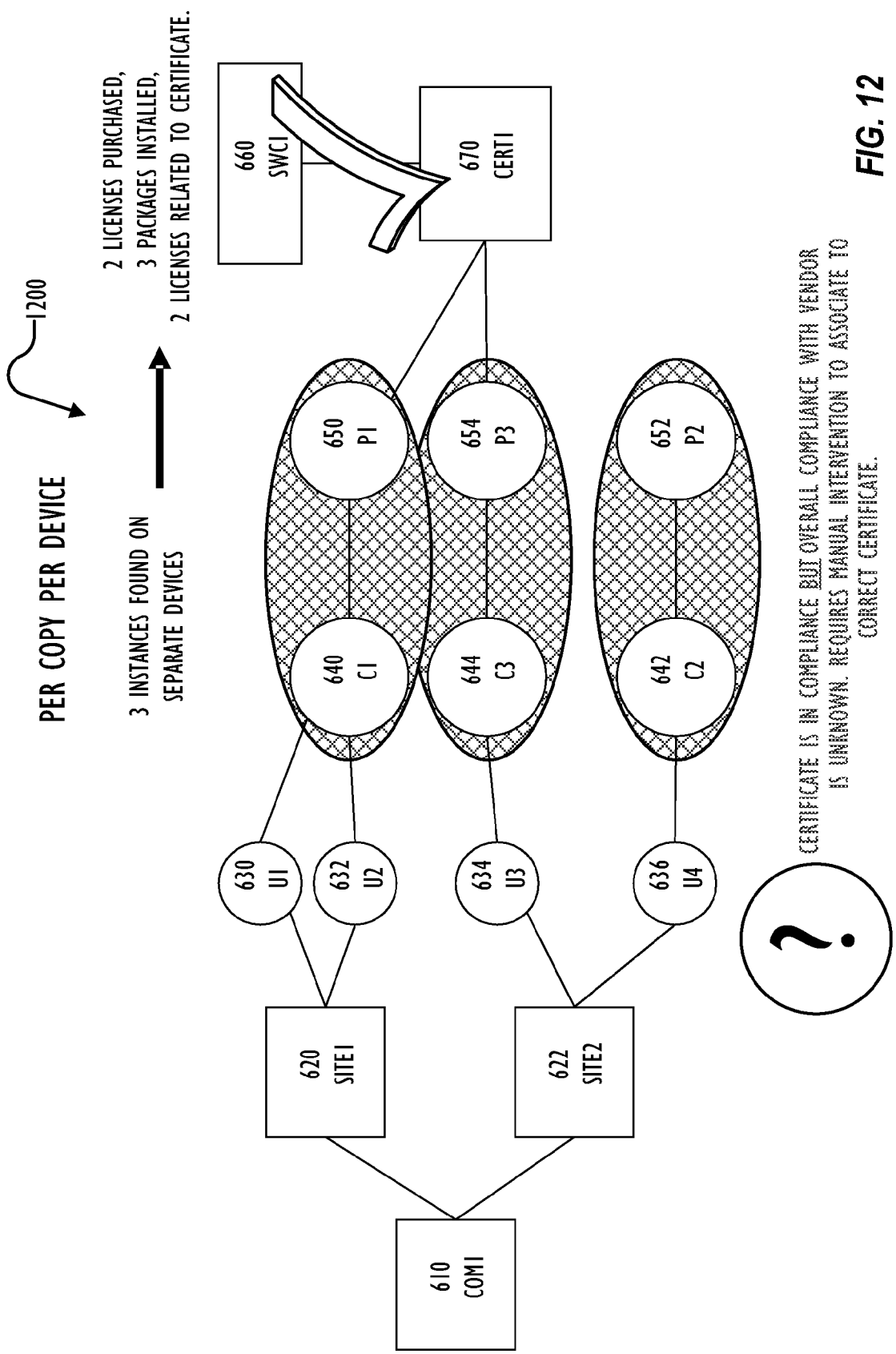

FIG. 12 illustrates a scenario 1200 where another per copy per device contract 660 is evaluated by the license engine 250. In this example, company 610 is in compliance with the contract 660 as indicated by certificate 670, because two instances 650 and 654 of the software are installed, one on each of computers 640 and 644. But in this example, the connection or correlation phase of the license engine 250 processing discovers that there is no license certificate corresponding to the instance 652 installed on computer 642 for user 636 associated with site 622. In this scenario, overall compliance with the software vendor is unknown, because of the CI that cannot be connected to a software contract through a license certificate. The license engine 250 may flag this as a connection exception (in block 540 of FIG. 5), requesting intervention by a contract or asset manager to resolve the connection exception. For example, this scenario may indicate that the asset or contract manager omitted information when creating the license certificate or software contract data in the CMDB 260, which if corrected and the license engine rerun would indicate compliance. Or in another example, this scenario may indicate that an additional license may need to be acquired or that the instance 652 may need to be removed.

Figure 13:
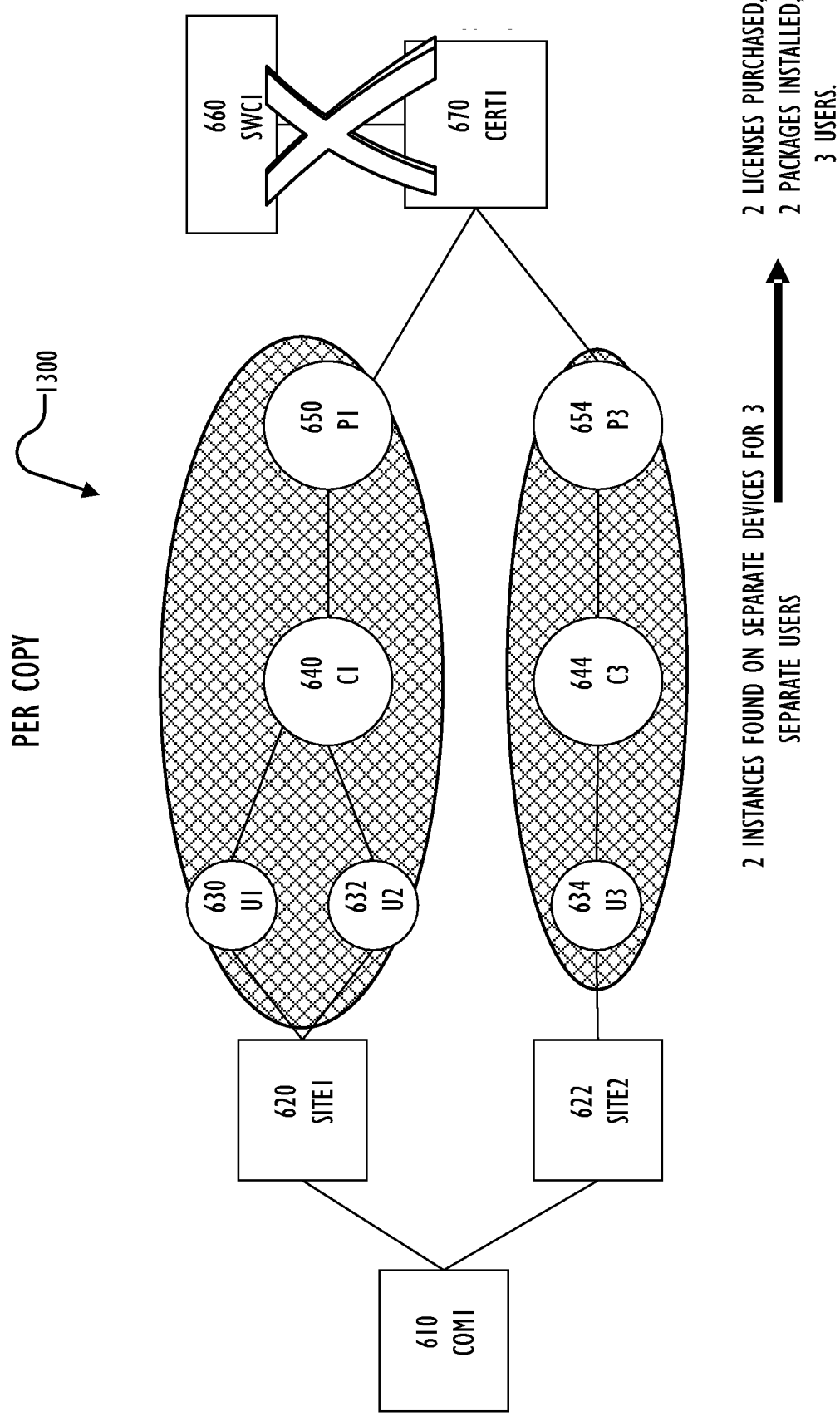

Example 1300 in FIG. 13 illustrates a per copy license contract 660 in which two licenses were purchased for company 610. Only two instances 650 and 654 of the licensed software are installed on two computers 640 and 644, but the instance 650 is associated with two users 630 and 632. Thus, three users of the two installations are found by the license engine 250, and an exception may be indicated that the contract 660 is out of compliance. In this scenario, either user 630 or 632 may be removed to achieve compliance.

Figure 14:
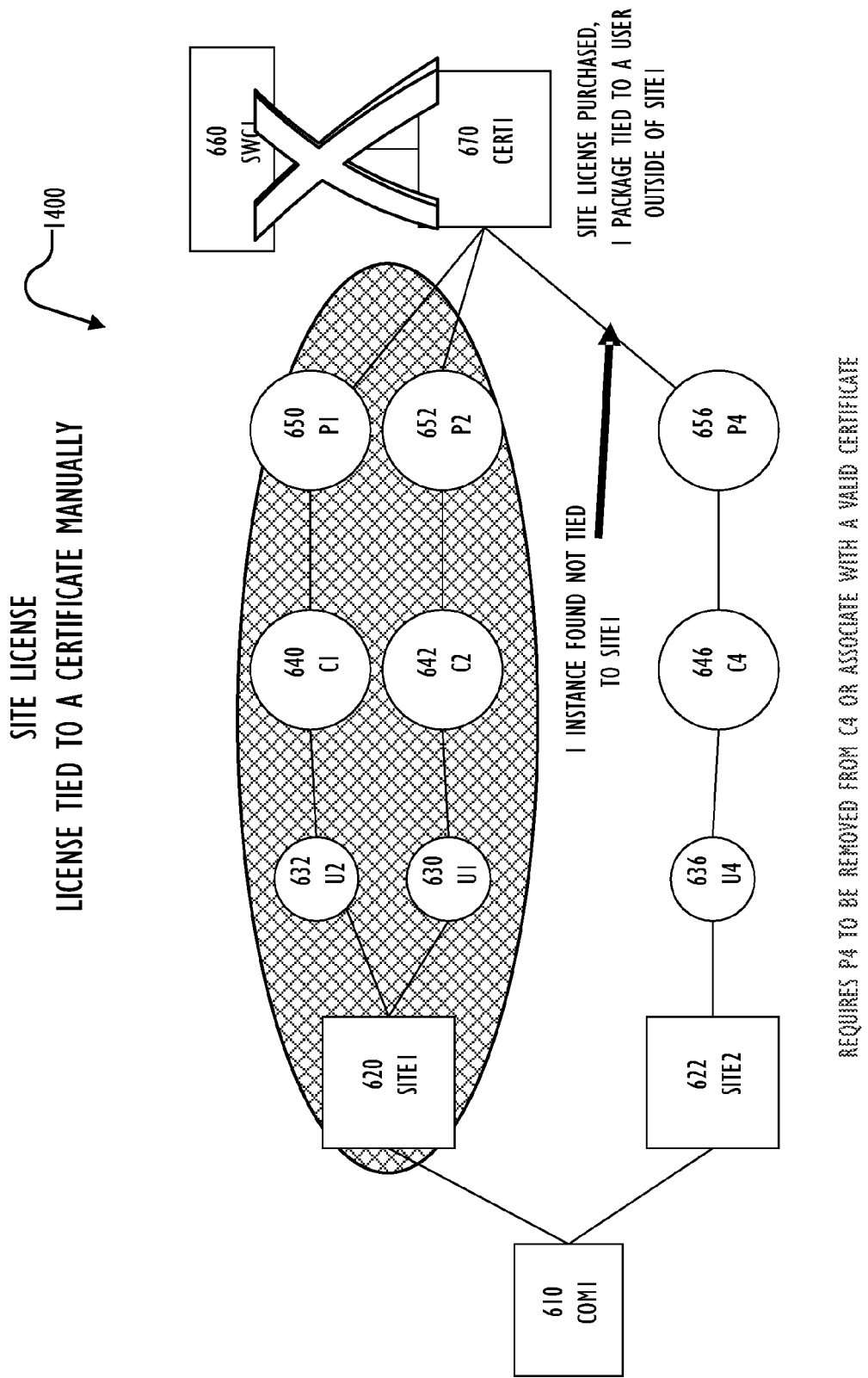

In FIG. 14, example 1400 is a graph illustrating a scenario where a site license was purchased in contract 660, but the license engine discovers that one additional instance of the licensed software was installed as package 656 on computer 646 for user by user 636 at site 622. The package 656 is not, therefore, at a site defined by the contract 660. Thus, the license engine generates a non-compliance exception. To bring the company 610 back into compliance, either the package 656 may be removed or a license acquired for the user at site 622.

Figure 15:
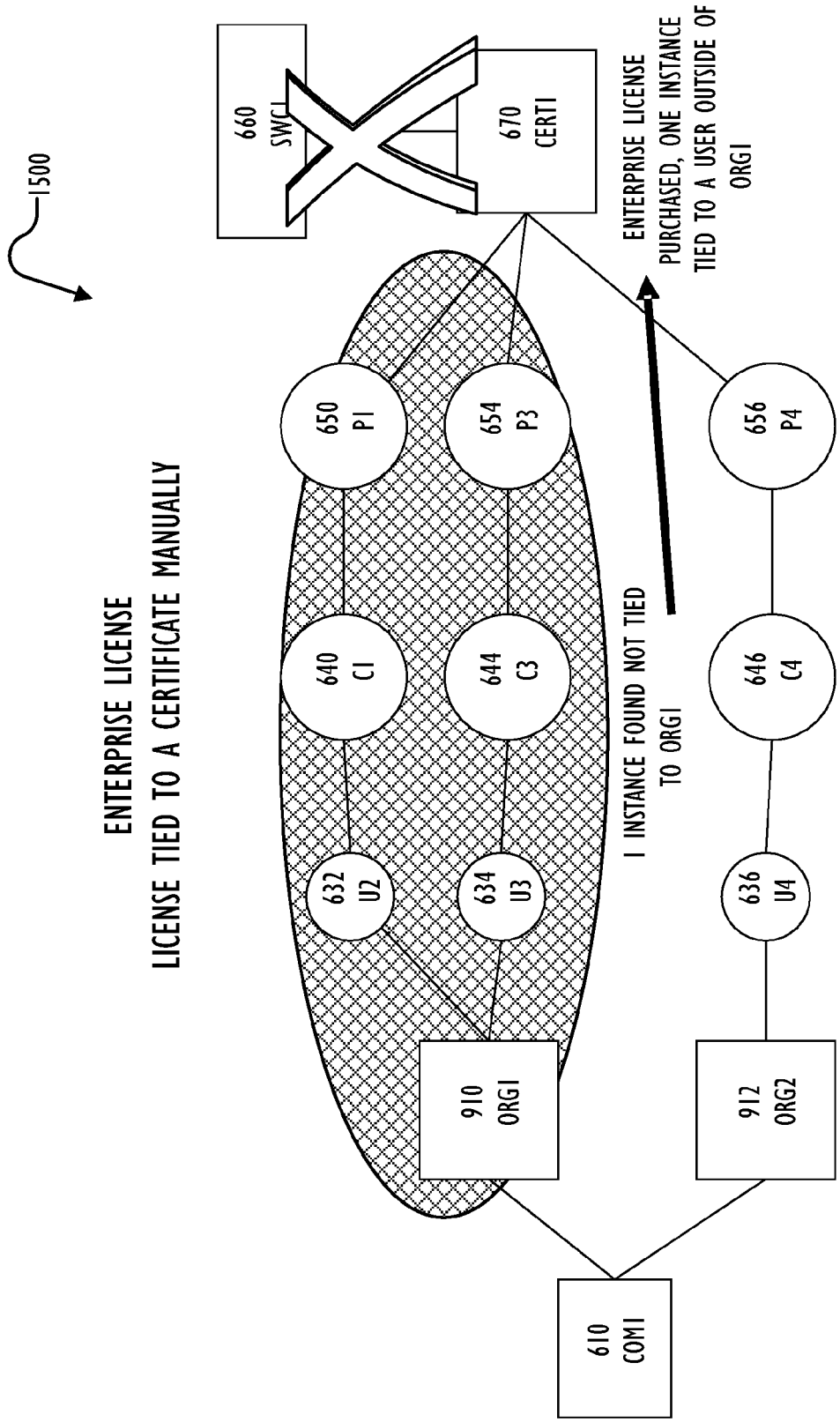

FIG. 15 is a graph illustrating example 1500, in which company 610 obtained an enterprise license for organizational unit 910. So both instances 650 and 654 that are associated with organizational unit 910 are in compliance with the contract 660, but the license engine 250 discovers that there is one instance 656 of the software installed that is tied to a user 636 of another organizational unit 912. Either the instance 656 may be removed from computer 646 or an additional license may be obtained and associated with a valid license certificate to bring the company 610 into compliance with its contractual obligations.

As described above, various embodiments allow contract or asset management personnel of an enterprise to evaluate software usage of their organization and determine whether the organization complies with software license contracts that are modeled in a CMDB. Where the organization is not in compliance, the license engine identifies the non-compliance and provides information that may allow the contract or asset manager to address the problems and bring the organization into compliance.

Because the license engine 250 is integrated with the CMDB server 110 and CMDB datastore 260, the various embodiments may allow for immediate and automatic feedback on the effect on software compliance of changes to the infrastructure modeled by the CMDB, in addition to on-demand runs of the license engine 250.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer-implemented method, comprising:
    modeling deployment of a software product and a software license contract for the software product;
    storing a first model of the modeled deployment of the software product in a configuration management database (CMDB) by storing information related to the software product as a first configuration item in the CMDB and by storing information related to the software license contract as a second configuration item in the CMDB;
    storing a second model of the modeled software license contract for the software product in a license database by generating a license certificate corresponding to the software license contract and storing the license certificate in the license database; and
    evaluating the deployment of the software product for compliance with the software license contract, comprising:
        connecting and comparing the first model and the second model by comparing the first configuration item with the license certificate and connecting the license certificate with the second configuration item responsive to comparing the first configuration item with the license certificate; and
        generating an exception indication if the act of comparing the first model and the second model indicates non-compliance with the software license contract.

2. The method of claim 1, wherein the act of storing a first model comprises:
    storing a third configuration item in the CMDB modeling at least a portion of an organizational structure;
    storing a fourth configuration item in the CMDB modeling a hardware element on which the software product is deployed.

3. The method of claim 2, wherein the act of connecting the first model and the second model comprises:
    comparing the third configuration item with the license certificate; and
    comparing the fourth configuration item with the license certificate.

4. The method of claim 2, wherein the act of connecting the first model and the second model comprises:
    comparing one or more of the third configuration item, the fourth configuration item, and the first configuration item with the license certificate; and
    connecting the license certificate with the second configuration item responsive to the act of comparing one or more of the third configuration item, the fourth configuration item, and the first configuration item with the license certificate.

5. The method of claim 1, wherein the act of evaluating is performed on demand.

6. The method of claim 1, wherein the act of evaluating is performed automatically responsive to a change in the CMDB.

7. The method of claim 1, wherein the act of connecting the first model and the second model comprises:
    generating an exception indication if the first model cannot be connected to the second model.

8. The method of claim 1, wherein the act of connecting the first model and the second model comprises:
    generating an exception indication if the first model can be connected to a plurality of models in the license database.

9. The method of claim 1, further comprising:
    outputting a result of the act of evaluating compliance from a license engine computer.

10. The method of claim 1, wherein the act of evaluating compliance further comprises:
    indicating a suggested action for achieving compliance if the act of comparing the first model and the second model indicates non-compliance with the software license contract.

11. The method of claim 1, further comprising:
    generating the second model, comprising:
        receiving a selection of a license type corresponding to the software license contract; and receiving license contract data corresponding to the selected license type.

12. The method of claim 11, wherein the act of generating the second model further comprises:
    providing a plurality of predetermined license types.

13. The method of claim 11, wherein the act of generating the second model further comprises:
    allowing a user to define a custom license type.

14. The method of claim 1, wherein the act of storing a second model comprises:
    generating a first license certificate corresponding to the software license contract;
    generating a second license certificate corresponding to the software license contract;

generating a master license certificate, grouping the first license certificate and the second license certificate; and storing the master license certificate, the first license certificate, and the second license certificate in the license database, and wherein the act of comparing the first model and the second model comprises:

comparing the master license certificate with the first model, comprising:

comparing the first license certificate with a first portion of the first model; and comparing the second license certificate with a second portion of the first model.

15. The method of claim 14, wherein the act of generating an exception indication comprises:

generating a first exception indication corresponding to the first license certificate if the act of comparing the first license certificate indicates non-compliance with the software license contract;

generating a second exception indication corresponding to the second license certificate if the act of comparing the second license certificate indicates non-compliance with the software license contract; and generating an exception indication corresponding to the master license certificate responsive to the generation of either the first exception indication or the second exception indication.

16. A system, comprising:
a server computer, comprising:
a processor;
a configuration database, coupled to the processor;
a license database, coupled to the processor; and
a program store, coupled to the processor, on which is stored instructions for the processor, wherein the instructions cause the processor to perform the method of claim 1.

17. The system of claim 16, wherein the server computer further comprises:
a database, comprising the configuration database and the license database.

18. The system of claim 16, further comprising:
a client computer, adapted to communicate with the server computer, wherein the client computer requests the processor to execute the instructions that cause the server processor to perform the method of claim 1.

19. A non-transitory computer readable medium with instructions for a programmable control device stored thereon wherein the instructions cause the programmable control device to perform the method of claim 1.

20. A networked computer system comprising:
a plurality of computers on which software products are deployed; and
one or more configuration management database computers, communicatively coupled to the plurality of computers, programmed to perform the method of claim 1.

* * * * *